//  US010862107B2

(12) United States Patent  
Ogata et al.

(10) Patent No.: US 10,862,107 B2  
(45) Date of Patent: Dec. 8, 2020

(54) COMPOSITE ANODE ACTIVE MATERIAL, ANODE AND LITHIUM BATTERY INCLUDING THE COMPOSITE ANODE ACTIVE MATERIAL, AND METHOD OF PREPARING THE COMPOSITE ANODE ACTIVE MATERIAL

(71) Applicants: Samsung Electronics Co., Ltd., Suwon-si (KR); Samsung SDI Co., Ltd., Yongin-si (KR)

(72) Inventors: Ken Ogata, Hwaseong-si (KR); Seongho Jeon, Pohang-si (KR); Koichi Takei, Hwaseong-si (KR); Sungsoo Han, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 405 days.

(21) Appl. No.: 15/397,910

(22) Filed: Jan. 4, 2017

(65) Prior Publication Data

US 2017/0346078 A1    Nov. 30, 2017

(30) Foreign Application Priority Data

May 31, 2016   (KR) .................. 10-2016-0067748

(51) Int. Cl.
```
H01M 4/36        (2006.01)
H01M 4/62        (2006.01)
H01M 10/0525     (2010.01)
H01M 4/38        (2006.01)
```
(Continued)

(52) U.S. Cl.
CPC ............. *H01M 4/364* (2013.01); *H01M 4/13* (2013.01); *H01M 10/0525* (2013.01); *H01M 4/386* (2013.01); *H01M 4/587* (2013.01)

(58) Field of Classification Search
CPC ........ H01M 4/13; H01M 4/134; H01M 4/364; H01M 4/386; H01M 4/587; H01M 10/0525
See application file for complete search history.

(56) References Cited

U.S. PATENT DOCUMENTS 8,974,967 B2    3/2015   Cui et al.  
2009/0291368 A1  11/2009  Newman et al.  
(Continued)

FOREIGN PATENT DOCUMENTS

JP    2012-084521    *  4/2012  
JP    2014-191936    *  10/2014  
(Continued)

OTHER PUBLICATIONS

English translation of JP Publication 2012-084521, Apr. 2012.*

(Continued)

*Primary Examiner* — Brittany L Raymond  
(74) *Attorney, Agent, or Firm* — Cantor Colburn LLP

(57) ABSTRACT

A composite anode active material includes a composite medium, the composite medium including a first medium block including a metal nanostructure capable of intercalation or deintercalation of lithium and a conductive medium disposed on the metal nanostructure; and a second medium block, disposed adjacent to the first medium block and including a medium which is free of the metal nanostructure.

29 Claims, 12 Drawing Sheets

(51) Int. Cl.
H01M 4/13 (2010.01)
H01M 4/587 (2010.01)

(56) References Cited

U.S. PATENT DOCUMENTS

| | | | |
|---|---|---|---|
| 2010/0239918 A1* | 9/2010 | Pratt | H01M 10/056 |
| | | | 429/307 |
| 2011/0136017 A1* | 6/2011 | Singh | H01M 4/134 |
| | | | 429/311 |
| 2016/0028089 A1 | 1/2016 | Arpin et al. | |

FOREIGN PATENT DOCUMENTS

| | | | |
|---|---|---|---|
| JP | 2014191936 A | 10/2014 | |
| JP | 5809897 B2 | 9/2015 | |

OTHER PUBLICATIONS

English translation of JP Publication 2014-191936, Oct. 2014.*
Bang et al., "High-Performance Macroporous Bulk Silicon Anodes Synthesized by Template-Free Chemical Etching", Adv. Energy Mater. 2012, 2, pp. 878-883.
Liu et al., "A Yolk-Shell Design for Stabilized and Scalable Li-Ion Battery Alloy Anodes", Nano Letters, 2012, 12, pp. 3315-3321.
Wu et al., "Stable cycling of double-walled silicon nanotube battery anodes through solid-electrolyte interphase control", Nature Nanotechnology, 2012, vol. 7, pp. 310-315.

* cited by examiner

COMPOSITE ANODE ACTIVE MATERIAL, ANODE AND LITHIUM BATTERY INCLUDING THE COMPOSITE ANODE ACTIVE MATERIAL, AND METHOD OF PREPARING THE COMPOSITE ANODE ACTIVE MATERIAL

CROSS-REFERENCE TO RELATED APPLICATION

This application claims priority to and the benefit of Korean Patent Application No. 10-2016-0067748, filed on May 31, 2016, in the Korean Intellectual Property Office, and all the benefits accruing therefrom under 35 U.S.C. §119, the content of which is incorporated herein in its entirety by reference.

BACKGROUND

1. Field

The present disclosure relates to a composite anode active material, an anode and a lithium battery each including the composite anode active material, and a method of preparing the composite anode active material.

2. Description of the Related Art

A representative example of an anode active material which may be used for a lithium battery is a carbonaceous material, such as graphite. Graphite has excellent capacity retention characteristics and excellent electrical potential characteristics. Graphite is also capable of providing batteries with high-stability since graphite does not change volumetrically during intercalation and/or deintercalation of lithium. The theoretical electrical capacity of graphite is about 372 milliamperes per gram (mAh/g). Graphite has minimal irreversible capacity.

Another example of an anode active material which may be used for a lithium battery is a lithium-alloyable metal. The lithium-alloyable metal may be Si, Sn, Al, or the like. The lithium-alloyable metal has an electrical capacity which may be at least 10 times greater than the electrical capacity of graphite. During charging and discharging, the lithium-alloyable metal expands or shrinks volumetrically, causing an active material to be isolated within an electrode. Also due to an increase in a specific area of the lithium-alloyable metal, there is increased decomposition of an electrolyte present in the lithium battery, leading to a decrease in the battery's lifespan characteristics.

Accordingly, there is a need to develop a composite anode active material which has a high electrical capacity similar to a lithium-alloyable metal and for which deterioration is suppressed.

SUMMARY

Provided is a composite anode active material having increased capacity and lifespan characteristics.

Provided is an anode including the composite anode active material.

Provided is a lithium battery including the anode.

Provided is a method of preparing the composite anode active material.

According to an aspect of an embodiment, a composite anode active material includes a composite medium, the composite medium including: a first medium block including a metal nanostructure capable of intercalation or deintercalation of lithium and a conductive medium disposed on the metal nanostructure; and a second medium block disposed adjacent to the first medium block and including a metal nanostructure-free medium.

According to an aspect of another embodiment, an anode includes a composite anode active material, the composite active material including a composite medium, wherein the composite medium includes a first medium block comprising a metal nanostructure capable of intercalation or deintercalation of lithium and a conductive medium disposed on the metal nanostructure and a second medium block disposed adjacent to the first medium block, and including a metal nanostructure-free medium.

According to an aspect of another embodiment, a lithium battery includes the anode.

According to an aspect of another embodiment, a method of preparing a composite anode active material includes: preparing an electrochemical cell including a counter electrode, and a working electrode including a metal capable of intercalation or deintercalation of lithium and a carbonaceous conductive agent; applying a sweep voltage across the electrochemical cell in a voltage range of 0 volts (V) to about 3 V as measured by a lithium metal reference electrode; and obtaining a working electrode including the composite anode active material in the electrochemical cell to prepare the composite anode active material.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
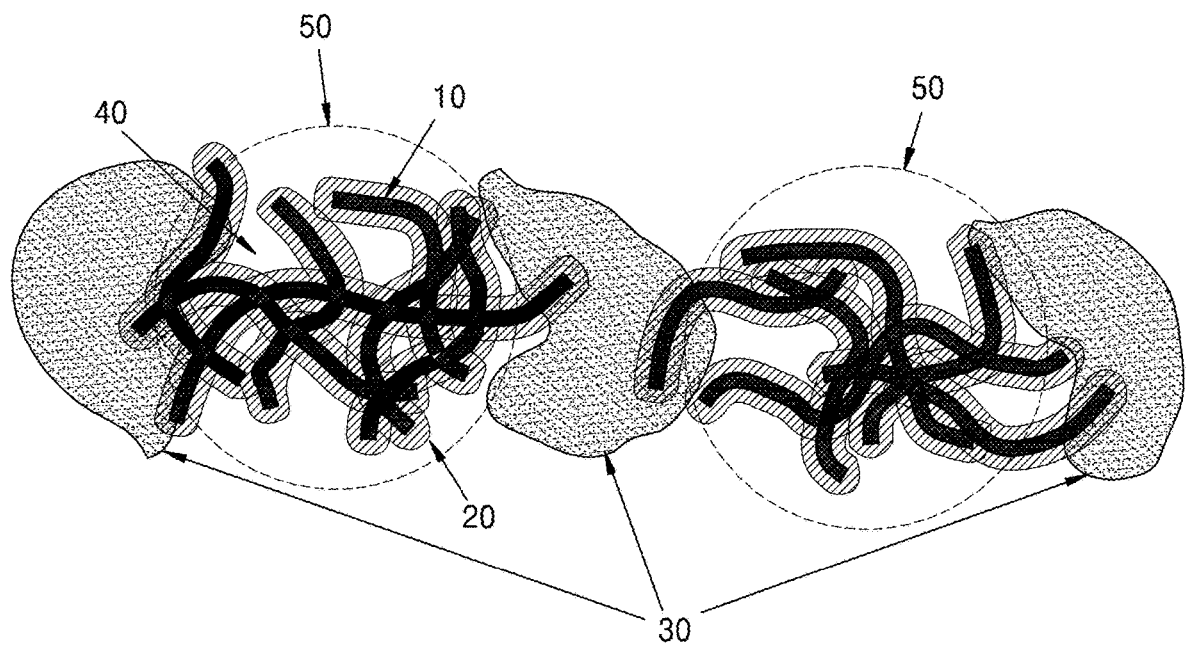
FIG. 1 is a schematic view of a composite anode active material according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A composite anode active material, an anode and a lithium battery each including the composite anode active material, and methods of preparing the composite anode active material, will be described in further detail.

As disclosed herein, the term "medium" as it relates to a composite anode active material refers to a portion of the composite anode active material that does not intercalate or deintercalate lithium. The medium forms a composite composition together with a metal nanostructure that intercalates or deintercalates lithium. The medium is distinguishable from, for example, a conducting agent, a binder, or an electrolyte, which are simply mixed with a composite anode active material in the process of preparing an anode.

The term "conducting medium" or "conductive medium" as used herein refers to a medium having ionic conductivity and/or electronic conductivity.

The term "composite" as used herein refers to a material formed by combining two or more materials having different physical and/or chemical properties, wherein the composite has properties different from each material constituting the composite, and wherein particles or wires of each material are at least microscopically separated and distinguishable from each other in a finished structure of the composite. The materials of the composite have bonding relationships with each other that are formed through, for example, a mechanochemical, electrochemical, and/or chemical reaction, instead of being in physical contact with one another by simply mixing the materials together. In an embodiment, the term "composite anode active material" refers to an anode active material obtained through a mechanochemical, electrochemical, and/or chemical reaction.

As used herein, the term "metal nanostructure-free medium" refers to a medium which does not include a metal nanostructure.

A composite anode active material according to an embodiment of the present disclosure includes a composite medium, wherein the composite medium includes: a first medium block including a metal nanostructure capable of intercalation and/or deintercalation of lithium, and a conductive medium disposed on the metal nanostructure; and a second medium block disposed adjacent to the first medium block and including a metal nanostructure-free medium (e.g., a medium which is free of the metal nanostructure). In an embodiment, the composite medium includes a plurality of first medium blocks which are spaced apart from each other, and the second medium block is disposed between adjacent first medium blocks in the plurality of first medium blocks.

Regarding the composite medium, since the conductive medium is disposed on the metal nanostructure, the volumetric change which occurs in the metal nanostructure during charging or discharging of the battery may be accommodated, and a side reaction between the metal nanostructure and an electrolyte and a resulting decrease in the lifespan of a lithium battery, may be effectively prevented. Regarding the composite medium, since the second medium block is disposed adjacent to the first medium block, and among the plurality of first medium blocks, the volumetric change which occurs in the first medium block during charging or discharging of the battery may be accommodated, and thus, a decrease in the lifespan of a lithium battery may be prevented.

Figure 2A:
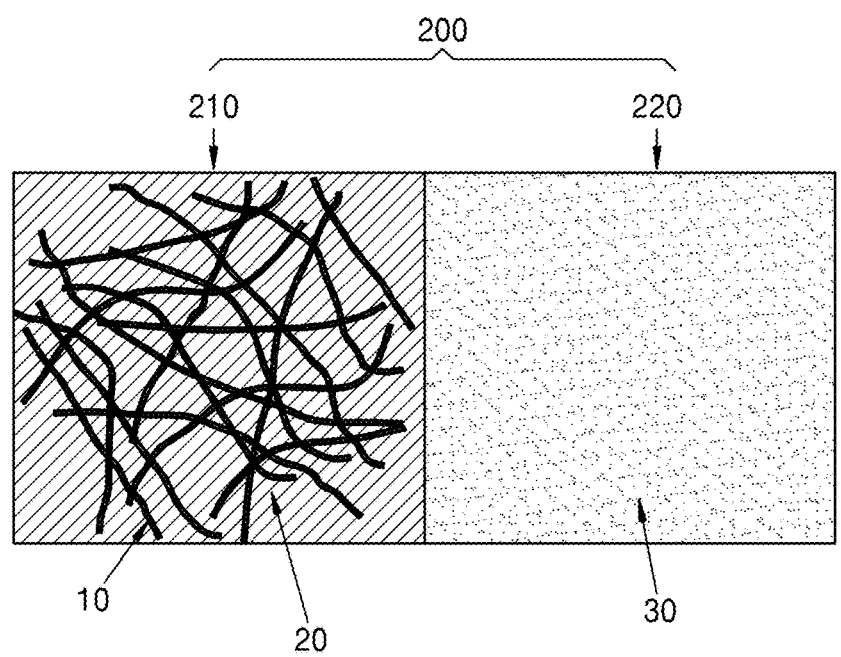
FIG. 2A is a schematic view of a composite medium unit included in a composite anode active material according to an embodiment.

Referring to FIGS. 1 and 2A, a metal nanostructure 10 and a conductive medium 20 disposed on the metal nanostructure 10 form a first medium block 210, and a metal nanostructure-free medium 30 disposed between a plurality of first medium blocks forms a second medium block 220. The first medium block 210 may be understood to be a structure in which the metal nanostructure infiltrates into the conductive medium, e.g., is encased by, or coated by, the conductive medium. The first medium block may have a pore 40. Due to the presence of the pore 40 in the first medium block 210, the volumetric change which occurs in the metal nanostructure during charging or discharging may be effectively tolerated. A plurality of one-dimensional metal nanostructures may be connected to form a three-dimensional metal nanostructure cluster 50.

Referring to FIG. 2A, a composite medium may include a composite medium unit 200. The composite medium unit may include a first medium block 210 and a second medium block 220 connected to an end of the first medium block 210. Although not illustrated in FIG. 2A, the first medium block 210 may have pores 40 as shown in FIG. 1. The composite medium unit 200 is a basic structural unit of the composite medium. Instead of being in contact with each other by simple mixing, the first medium block 210 and the second medium block 220 may be connected to form a single composite through a mechanochemical reaction, an electrochemical reaction, and/or a chemical reaction. Accordingly, the composite medium including the composite medium unit 200 is distinguishable from a composition in which a metal nanostructure coated with a conductive coating layer and a solid electrolyte are simply mixed together.

Figure 2B:
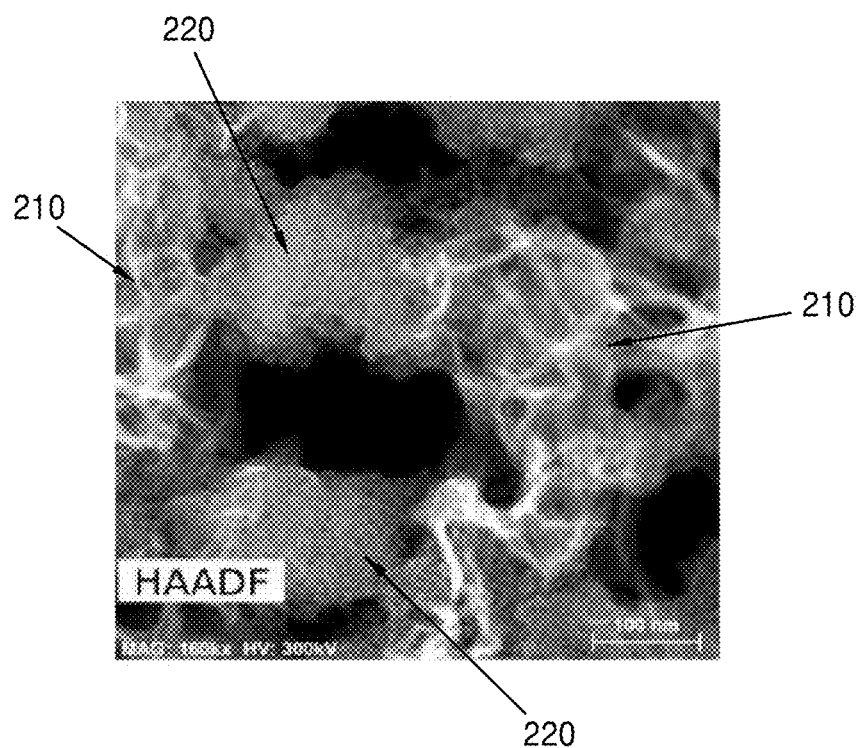
FIG. 2B shows a transmission electron microscopic (TEM) image of a composite medium unit included in a composite anode active material prepared according to Example 1.

Referring to FIG. 2B, which is a TEM image of composite medium unit of a composite anode active material prepared according to Example 1, an end of a first medium block 210 is connected to an end of a second medium block 220. Referring to FIGS. 2B and 6C, the second medium block 220 is indicated by the region marked with number 1, and the first medium block 210 is indicated by the region marked with 2.

Figure 3:
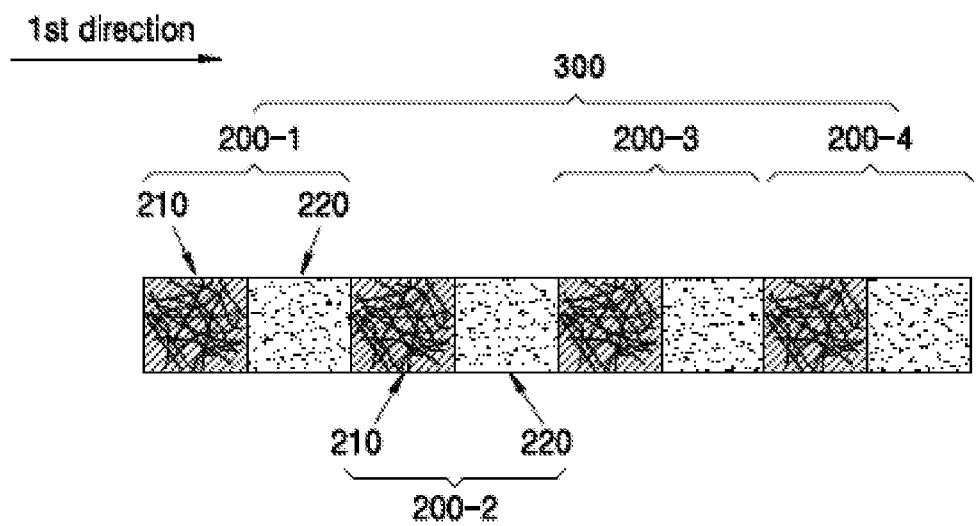
FIG. 3 is a schematic view of a composite medium chain included in a composite anode active material according to an embodiment.

Referring to FIG. 3, a composite medium may include a composite medium chain 300. The composite medium chain 300 may include a plurality of composite medium units 200-1, 200-2, 200-3, 200-4 that are arranged in a first direction. The composite medium chain 300 may be formed by repeatedly extending composite medium units from an end of one composite medium unit. In an embodiment, the composite medium chain may extend in a direction such that a second composite medium unit, a third composite medium unit, and a fourth medium composite unit are sequentially connected to an end of a first composite medium unit. In an embodiment, in the composite medium chain, an end of a first medium block 210 in the first composite medium unit 200-1 is connected to a first end of a second medium block 220 in the first composite medium unit 200-1, and an opposite second end of the second medium block 220 is connected to a first end of a first medium block 210 in the second composite medium unit 200-2.

Referring to FIG. 3, in the composite medium chain 300, a first medium block 210 and a second medium block 220 may be alternately arranged in a first direction. That is, in the composite medium chain 300, first medium blocks 210 may be non-continuously arranged in one direction by the intervening second medium blocks. As shown in FIG. 3, the first medium blocks 210 and the second medium blocks 220 may be arranged in an alternating pattern. Alternatively, in one or more embodiments, although not illustrated in FIG. 3, first medium blocks 210 and the second medium blocks 220 may be arranged in a random order such that the first medium blocks and the second medium blocks do not conform to a pattern (e.g., to provide an irregular arrangement) in the first direction. That is, in the composite medium chain, first medium blocks 210 and second medium blocks 220 may not be arranged as an alternating sequence of blocks, but may instead be arranged in various other sequences in the first direction, such as a random arrangement.

Figure 4:
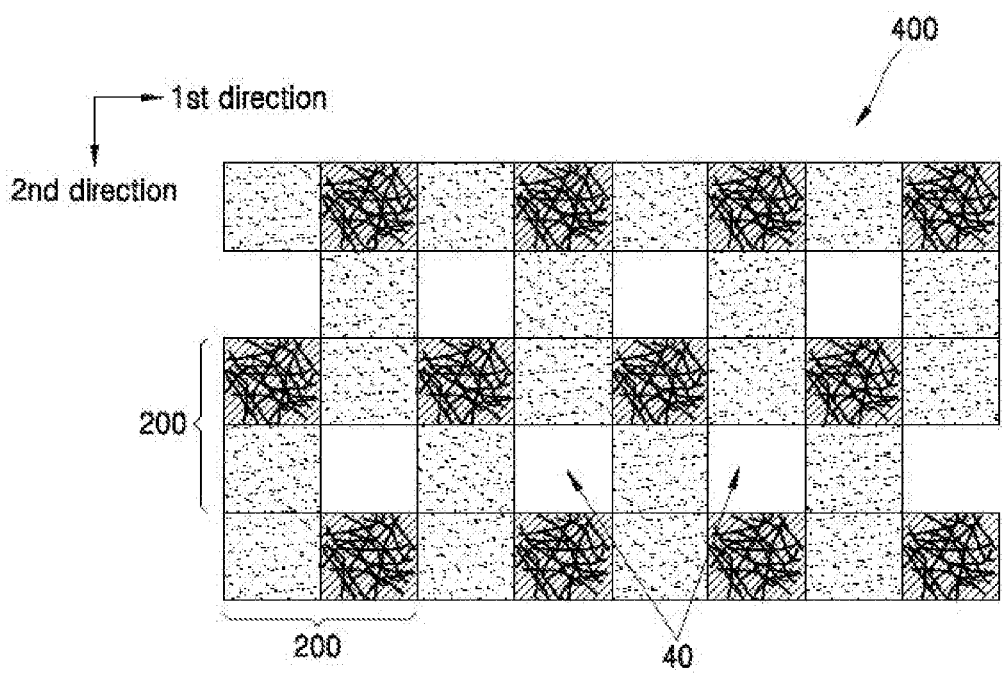
FIG. 4 is a schematic view of a composite medium sheet included in a composite anode active material according to an embodiment.

Referring to FIG. 4, the composite medium may include a composite medium sheet 400. The composite medium sheet 400 may include a plurality of composite medium units 200 which are arranged in a second direction that is distinguishable from the first direction. In an embodiment, the composite sheet may include a plurality of composite medium units arranged in the first direction, and a plurality of composite medium units arranged in the second direction that is distinguishable from the first direction. The composite medium sheet 400 may be formed in such a way that, starting from an end of one composite medium unit 200, additional composite medium units 200 may be arranged in the first direction, and from an end of the composite medium unit 200 that is different from the starting end above, composite medium units 200 may be arranged in the second direction. An angle formed by the first direction and the second direction is not particularly limited. In an embodiment, the angle formed by the first direction and the second direction may be in a range of 0° to about 180°, in an embodiment, about 30° to about 150°, in an embodiment, about 45° to about 135°, in an embodiment, about 60° to about 120°, or in an embodiment, about 90°.

Referring to FIG. 4, the composite medium sheet 400 may additionally include a pore 40 defined by a plurality of composite medium units spaced apart from each other. The pore 40 may be formed by the non-continuous arrangement of composite medium units 200. In an embodiment, a pore 40 is formed when a plurality of composite medium units 200 are two-dimensionally spaced apart from one another. That is, the composite medium sheet 400 may include a pore 40. Since the composite medium sheet 400 includes a pore 40, the volumetric change which occurs in the first medium block 210 included in the composite medium sheet during charging or discharging may be effectively tolerated.

In the composite medium sheet 400, the pore occupies, in an embodiment, about 0.1 to about 50%, in an embodiment, about 0.1 to about 40%, in an embodiment, about 0.1 to about 30%, or, in an embodiment, about 0.1 to about 20%, based on the total area of the composite medium sheet. However, the present disclosure is not limited to these ranges. The total area of the pore may be appropriately adjusted by the person of skill in the art, in order to obtain improved charge and discharge characteristics.

Figure 5:
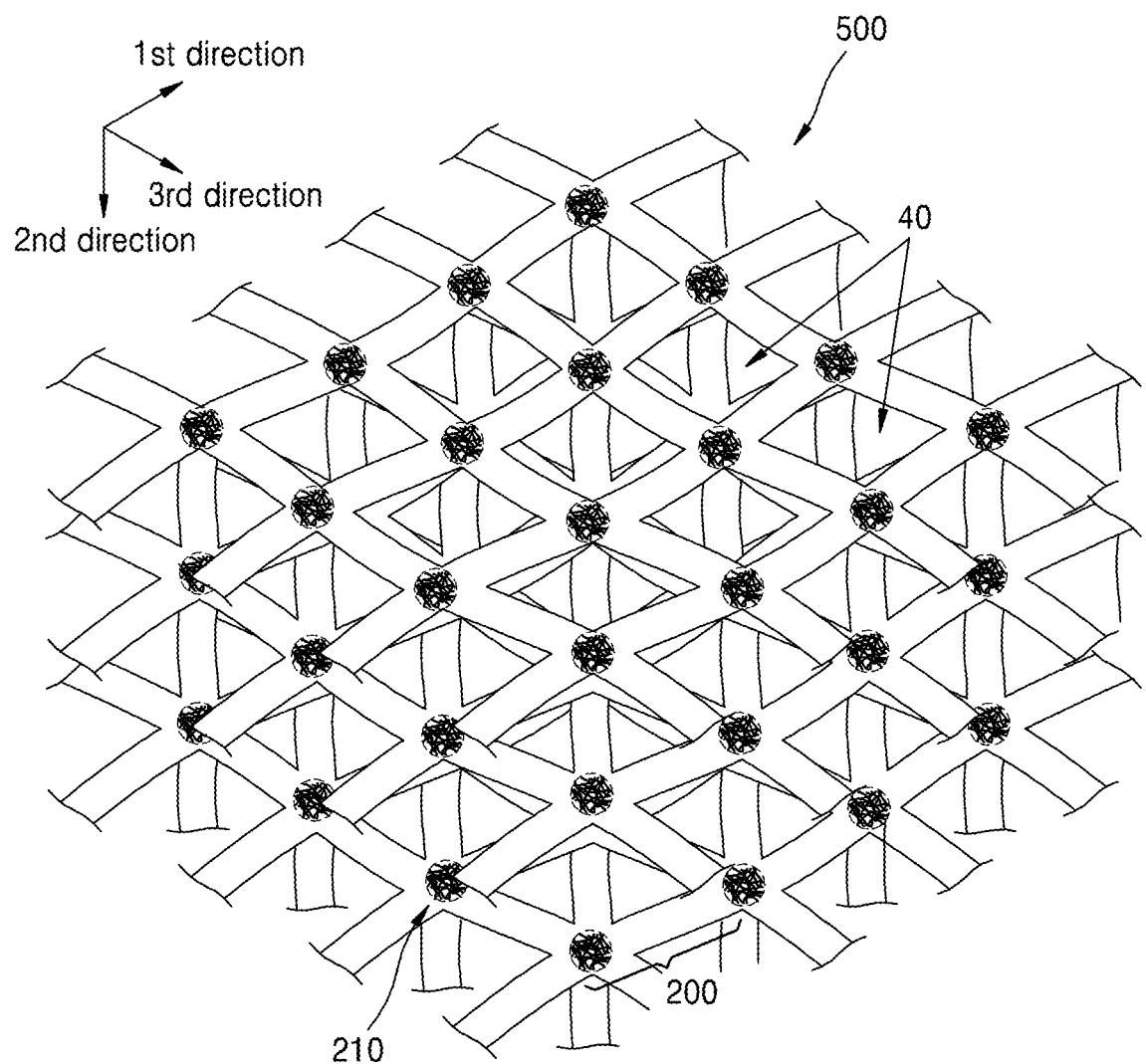
FIG. 5 is a schematic view of a composite medium cluster included in a composite anode active material according to an embodiment.

Referring to FIG. 5, the composite medium may include a composite medium cluster 500. The composite medium cluster 500 may include a plurality of composite medium units 200 which are arranged in a first direction, a plurality of composite medium units 20 which are arranged in a second direction that is distinguishable from the first direction, and a plurality of composite medium units which are arranged in a third direction that is distinguishable from the first and second directions. In an embodiment, the composite medium cluster may be formed by repeatedly arranging a composite medium unit 200 from an end of one composite medium unit in the first direction, repeatedly arranging a composite medium unit from an end thereof that is different from the end described above in the second direction, and repeatedly arranging a composite medium unit from an end thereof that is different from the ends described above in the third direction. An angle formed by the first direction and the second direction, an angle formed by the second direction and the third direction, and an angle formed by the third direction and the first direction are not limited, and may be, each independently, in a range of, in an embodiment, 0° to about 180°, in an embodiment, about 30° to about 150°, in an embodiment, about 45° to about 135°, in an embodiment, about 60° to about 120°, or, in an embodiment, about 90°. The composite medium cluster may additionally include a pore 60, which occupies, based on the volume of the composite medium cluster, in an embodiment, about 0.1 to about 50%, in an embodiment, about 0.1 to about 40%, in an embodiment, about 0.1 to about 30%, or, in an embodiment, about 0.1 to about 20%, based on a total area of the composite medium cluster. However, the volume of the pore is not limited to these ranges, and may be appropriately adjusted by the person of skill in the art, in order to obtain improved charge and discharge characteristics.

Referring to FIG. 5, the pore 40 included in the composite medium cluster 500 may be defined by a plurality of composite medium units 200 spaced apart from each other. The pore 40 may be formed by the non-continuous arrangement of the composite medium units 200 across the structure of the composite medium cluster 500. In an embodiment, a pore 40 may be formed by three-dimensionally arranging a plurality of composite medium units 200 so that they are spaced apart from one another. That is, the composite medium cluster 500 may include a plurality of pores 40. The pores may be continuously or non-continuously disposed in the composite medium cluster. In one or more embodiments, the pores may be periodically or non-periodically arranged in the composite medium cluster. In an embodiment, a plurality of pores may be connected to form a channel. Since the composite medium cluster includes pores, the volumetric change of the first medium block in the composite medium cluster which occurs during charging or discharging of the battery, may be effectively endured. The composite medium cluster thus may have a porous, three-dimensional structure.

The structure of the composite medium cluster according to an embodiment of the present disclosure may be similar to that of a porous three-dimensional structure of the prior art, since the composite medium cluster according to an embodiment of the present disclosure and the porous three-dimensional structure of the prior art may each have a porous three-dimensional structure. However, the porous three-dimensional nanostructure of the prior art may consist of either a medium having an electrochemical activity (e.g., electrically conductive) or a medium having an electrochemical inactivity (e.g., electrically non-conductive). For example, the porous three-dimensional nanostructure of the prior art may consist of a porous silicon foam or a porous alumina foam. In contrast, the porous three-dimensional structure according to an embodiment of the present disclosure, includes a skeleton medium that includes a first medium including a metal nanostructure having an electrochemical activity and a second medium having an electrochemical inactivity. That is, the porous three-dimensional structure according to an embodiment of the present disclosure includes areas having different properties. In particular, the second medium is disposed between adjacent first media, thereby absorbing the volumetric change of the metal nanostructure included in the first media during charging or discharging of the battery, and connecting the porous three-dimensional structure overall. In other words, the metal nanostructure having an electrochemical activity constitutes only a portion of the porous three-dimensional structure according to an embodiment. Accordingly, the porous three-dimensional structure including the metal nanostructure according to an embodiment, is distinguishable from a porous three-dimensional structure that consists of a metal nanostructure alone or that does not include a metal nanostructure.

Referring to FIG. 5, the first medium block 210 is positioned where individual composite medium chains intersect. However, the position of the first medium block is not limited thereto. In one or more embodiments, the first medium blocks may be arranged in a random or irregular manner.

Referring to FIG. 5, to emphasize the porosity, the three-dimensional structure is illustrated in such a way that pores dominate the three-dimensional structure. However, the size of pores may be adjusted to obtain improved charge and discharge characteristics. In one or more embodiments, the three-dimensional structure may not include pores.

Referring to FIGS. 2A to 5, the composite medium unit 200 of FIG. 2A is repeatedly arranged to form a composite medium chain 300, and the composite medium chain is repeatedly arranged to form a composite medium sheet 400, and the composite medium sheet is repeatedly arranged to form a composite medium cluster 500. Accordingly, the composite medium may have a hierarchical structure.

In the composite medium, a plurality of first medium blocks 210 may be spaced apart at certain defined intervals and may be periodically arranged. Referring to FIG. 4, in the composite medium sheet 400, the first medium blocks 210 may be periodically arranged in a diagonal direction. Since the first medium blocks 210 in the composite medium are periodically arranged, regularity may be provided to the composite medium. In one or more embodiments, the first medium blocks in the composite medium may be periodically arranged in a direction other than the direction illustrated in FIG. 4. The first medium blocks or the second medium blocks may also be spaced apart from each other at certain intervals and periodically arranged in the composite medium cluster.

In the composite medium, the second medium block disposed between adjacent first medium blocks, may comprise, consist essentially of, or consist of a buffer medium that is capable of absorbing the volumetric change which occurs in the first medium blocks connected to the second medium block. The term "buffer medium" indicates a medium that does not participate in an electrochemical reaction and but which has ionic conductivity and/or electronic conductivity. Since the buffer medium is present between adjacent first medium blocks, the volumetric change which occurs in the first medium blocks during charging or discharging may be more effectively endured. The second medium block may be different from the first medium block in that the second medium block does not include a metal nanostructure (e.g., the medium is metal nanostructure-free).

The first medium block and the second medium block in the composite medium may each independently have a size (e.g., a dimension, such as a height or a width dimension, such as a dimension along a major surface) of about 10 nanometers (nm) to about 10 micrometers (μm). In an embodiment, each of the first medium block and the second medium block may each independently have a size of about 50 nm to about 1 μm. In an embodiment, each of the first medium block and the second medium block may have a size of about 50 nm to about 900 nm. In an embodiment, each of the first medium block and the second medium block may have a size of about 50 nm to about 600 nm. In an embodiment, each of the first medium block and the second medium block may have a size of about 50 nm to about 300 nm. In an embodiment, each of the first medium block and the second medium block may have a size of about 50 nm to about 200 nm. In an embodiment, each of the first medium block and the second medium block may have a size of 50 nm to 150 nm. Within the above-described ranges, the charge and discharge characteristics of a lithium battery may be improved. The size of each of the first medium block and the second medium block may be defined by the distance between adjacent medium blocks. In an embodiment, when a second medium block is disposed between two first medium blocks, the size of the second medium block may refer to the distance between the two first medium blocks which are at opposite ends of the second medium block. In one or more embodiments, the size of each of the first medium block and the second medium block may be defined by the distance between adjacent pores. In an embodiment, when an end of a second medium block contacts a pore and an end of the second medium block opposite the end thereof contacts another pore, the distance between the pores, or alternatively the distance between ends of second medium block, refers to the size of the second medium block.

In the first medium block, the conductive medium disposed on the metal nanostructure may be a coating layer disposed on a surface of the metal nanostructure and which coats the metal nanostructure. The conductive medium may be a coating which partially covers, substantially covers, or completely covers the surface of the metal nanostructure. In one or more embodiments, the metal nanostructure may infiltrate into, and thus be encased by the conductive medium. Accordingly, in an embodiment, the entire surface of the metal nanostructure is covered by the conductive medium. Since the conductive medium covers the metal nanostructure, a side reaction between the metal nanostructure and an electrolytic solution may be suppressed, and an additional solid electrolyte interface (SEI) layer may not be formed, leading to the manufacture of a lithium battery including a composite anode active material with improved lifespan characteristics.

The coating layer, formed by coating the conductive medium on the metal nanostructure, may have a thickness of about 0.1 nm to about 100 nm. In an embodiment, a thickness of the coating layer may be in a range of about 1 nm to about 80 nm. In an embodiment, a thickness of the coating layer may be in a range of about 1 nm to about 50 nm. In an embodiment, a thickness of the coating layer may be in a range of about 1 nm to about 30 nm. In an embodiment, a thickness of the coating layer may be in a range of about 5 nm to about 30 nm. Within the above-described thickness ranges for the coating layer, a manufactured lithium battery may have improved charge and discharge characteristics.

The metal nanostructure in the composite medium may be a one-dimensional metal nanostructure. As used herein, the term "nanostructure" refers to a one-dimensional metal material having one dimension (e.g., a diameter) which is on a nanoscale level, i.e. a dimension of less than about 100 nm, and another dimension (e.g., a length) which is about 100 nm to about 1 μm, or greater than about 1 μm (i.e. at a microscale level).

The one-dimensional metal nanostructure in the composite medium may or may not be in a straight line. In an embodiment, the one-dimensional metal nanostructure may be in a curved line. In an embodiment, the one-dimensional metal nanostructure may be at least one selected from a metal nanowire, metal nanofiber, metal nanofilament, and the like, but is not limited thereto. The one-dimensional metal nanostructure may be any one-dimensional metal nanostructure that is capable of intercalation and deintercalation of lithium.

A diameter of the one-dimensional metal nanostructure in the composite medium may be about 100 nm or less. In an embodiment, a diameter of the one-dimensional metal nanostructure in the composite medium may be in the range of about 0.1 nm to about 100 nm. In an embodiment, a diameter of the one-dimensional metal nanostructure in the composite medium may be in the range of about 0.1 nm to about 50 nm. In an embodiment, a diameter of the one-dimensional metal nanostructure in the composite medium may be in the range of about 0.1 nm to about 30 nm. In an embodiment, a diameter of the one-dimensional metal nanostructure in the composite medium may be in the range of about 0.1 nm to about 20 nm. In an embodiment, a diameter of the one-dimensional metal nanostructure in the composite medium may be in the range of about 0.1 nm to about 10 nm. Since the one-dimensional metal nanostructure has the above-described ranges of diameters, a lithium battery including the composite medium may have improved charge and discharge characteristics.

The one-dimensional metal nanostructure in the composite medium may include at least one metal selected from Si, Ge, Sn, and Pb. In an embodiment, the one-dimensional metal nanostructure may be a silicon nanowire or a germanium nanowire.

Referring to FIG. 1, the first medium block may include a plurality of one-dimensional metal nanostructures 10. The composite medium thus may include a three-dimensional metal nanostructure 50 including a plurality of one-dimensional metal nanostructures 10 which are randomly clustered together to form an irregular arrangement. In an embodiment, the three-dimensional metal nanostructure may be a three-dimensional metal nanostructure cluster. The three-dimensional metal nanostructure may have an irregular (e.g., uneven or non-symmetrical), continuous net structure.

Referring to FIGS. 1, 2B, and 6C, since the three-dimensional metal nanostructure 50 has a net structure, pores 40 may be present among the plurality of metal nanostructures 10. Thus in an embodiment, the three-dimensional metal nanostructure includes pores. Since pores 40 are present in the three-dimensional metal nanostructure 50, the volumetric change which occurs in the plurality of metal nanostructures 10 may be easily endured. In an embodiment, since a conducting medium 20 is coated on a surface of the metal nanostructure 10, pores 40 may be present among the one-dimensional metal nanostructures 10 coated with the conducting medium 20. In an embodiment, the first medium block 210 may include a three-dimensional metal nanostructure, a conducting medium formed on the three-dimensional metal nanostructure, and pores in the three-dimensional metal nanostructure.

A size (e.g., a dimension, such as a length, or a width dimension, such as a dimension along a major surface) of the three-dimensional metal nanostructure in the composite medium may be in a range of about 10 nm to about 10 μm. In an embodiment, a size of the three-dimensional metal nanostructure in the composite medium may be in the range of about 10 nm to about 1 μm. In an embodiment, a size of the three-dimensional metal nanostructure in the composite medium may be in the range of about 10 nm to about 900 nm. In an embodiment, a size of the three-dimensional metal nanostructure in the composite medium may be in the range of about 10 nm to about 600 nm. In an embodiment, a size of the three-dimensional metal nanostructure in the composite medium may be in the range of about 10 nm to about 300 nm. In an embodiment, a size of the three-dimensional metal nanostructure in the composite medium may be in the range of about 10 nm to about 200 nm. In an embodiment, a size of the three-dimensional metal nanostructure in the composite medium may be in the range of about 10 nm to about 150 nm. In an embodiment, a size of the three-dimensional metal nanostructure in the composite medium may be in the range of about 10 nm to about 100 nm. In an embodiment, a size of the three-dimensional metal nanostructure in the composite medium may be in the range of about 10 nm to about 50 nm. When the size of the three-dimensional metal nanostructure is within the above-described ranges, the charge and discharge characteristics of a lithium battery may be improved.

When the first medium block consists essentially of, or consists of the three-dimensional metal nanostructure (e.g., the three-dimensional metal nanostructure dominates the area of the first medium block), the size of the three-dimensional metal nanostructure may be essentially the same as the size of the first medium block. In an embodiment, the size of the three-dimensional metal nanostructure may be defined by the distance between second medium blocks which are adjacent to the first medium block. In an embodiment, when a first medium block is disposed between two second medium blocks, the size of the three-dimensional metal nanostructure included in the first medium block may be determined by the distance from an end of the first medium block connected to one of the second medium blocks to an end of the first medium block that is opposite to the end thereof and which is connected to the other second medium block. In one or more embodiments, when the three-dimensional metal nanostructure is present in only a portion of the first medium block, the size of the three-dimensional metal nanostructure refers to a diameter of a circle that has the same area as the three-dimensional metal nanostructure occupies in the first medium block. The conductive medium in the first medium block of the composite medium may include at least one element selected from C, O, F, Cl, Br, I, P, N, S, B, Sb, As, Si, Ge, Sn, Pb, and Al. In an embodiment, the conductive medium may include at least one element selected from C, O, F, and P.

The conductive medium included in the first medium block and the metal nanostructure-free medium included in the second medium block may include at least one selected from an organic lithium ion conductor, an inorganic lithium ion conductor, and an organic and inorganic composite lithium ion conductor.

In an embodiment, the organic lithium ion conductor included in the first medium block or the second medium block may include: at least one polymer selected from polyethylene oxide, polypropylene oxide, poly(methyl methacrylate), poly(ethyl methacrylate), poly(dimethylsiloxane), poly(acrylic acid), poly(methacrylic acid), poly (methyl acrylate), poly(ethyl acrylate), poly(2-ethylhexyl acrylate), poly(butyl methacrylate), poly(2-ethylhexyl methacrylate), poly(decyl acrylate), and poly(ethylene vinyl acetate); or a mixture of the forgoing materials and a lithium salt. In one or more embodiments, the organic lithium ion conductor included in the first medium block or the second medium block may be a product that is obtained by subjecting these organic materials to a mechanochemical, electrochemical, and/or chemical reaction.

In an embodiment, the inorganic lithium ion conductor included in the first medium block or the second medium block may include at least one selected from a glass or amorphous metal ion conductor, a ceramic active metal ion conductor, and a glass ceramic active metal ion conductor, but embodiments of the present disclosure are not limited thereto. The inorganic lithium ion conductor may be any material suitable for use as an inorganic lithium ion conductor.

In an embodiment, the inorganic lithium ion conductor may include: at least one selected from $BaTiO_3$, $Pb(Zr,Ti)O_3$(PZT), $Pb_{1-x}La_xZr_{1-y}Ti_yO_3$ (lanthanum-modified lead zirconate titanate (PLZT), ($0<x<1$, $0<y<1$), $PB(Mg_3Nb_{2/3})O_3$—$PbTiO_3$ (lead magnesium niobate-lead titanate, PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $Li_{1+x+y}(Al, Ga)_x(Ti, Ge)_{2-x}Si_yP_{3-y}O_{12}$ ($0<x<1$, $0<y<1$), lithium lanthanum titanate ($Li_xLa_yTiO_3$, $0<x<2$, $0<y<3$), lithium germanium thio phosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, and garnet-based ceramics ($Li_{3+x}La_3M_2O_{12}$, M=Te, Nb, Zr). In one or more embodiments, the inorganic lithium ion conductor included in the first medium block or the second medium block may be a product that is obtained by subjecting these inorganic materials to a mechanochemical, electrochemical, and/or chemical reaction.

In an embodiment, the organic and inorganic composite lithium ion conductor may be a composite of the organic lithium ion conductor and the inorganic lithium ion conductor.

These examples of the organic lithium ion conductor and the inorganic lithium ion conductor may be present in a composite state with other components in the composite medium, not being simply mixed with the components.

In an embodiment, the first medium block or the second medium block may further include a lithium salt. The lithium salt may be present as a cation and an anion in at least one of the first medium block and the second medium block. The lithium salt included in the first medium block and/or the second medium block may be at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each a natural number), LiCl, and LiI. In an embodiment, the lithium salt included in the first medium block and/or second medium block may be a product that is obtained by subjecting the lithium salt to a mechanochemical, electrochemical, and/or chemical reaction.

The conductive medium included in the first medium block of the composite medium may be a solid electrolyte. The solid electrolyte included in the first medium block may form a composite with a metal on a surface of the metal nanostructure. In an embodiment, the solid electrolyte included in the first medium may be a coating layer formed on a surface of the metal nanostructure by a separate coating process. In an embodiment, the solid electrolyte included in the first medium block may be a composite layer formed by an electrochemical reaction on the metal nanostructure. Accordingly, the solid electrolyte included in the first medium block is distinguishable from a solid electrolyte that is simply mixed with a metal nanostructure and contacts the metal nanostructure.

In the composite medium, the second medium block may include a medium having ionic (e.g., lithium ion) conductivity or electronic conductivity. Although the second medium block does not have an electrochemical activity, since the second medium block has lithium ion conductivity and/or electronic conductivity, the second medium block may provide an ion and/or an electron migration pathway and thus may absorb the volumetric change of the first medium block.

Figure 6A:
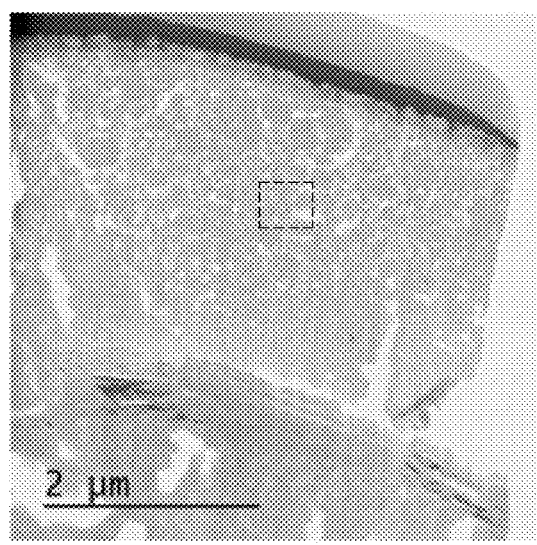
FIG. 6A shows a scanning electron microscope (SEM) image of a cross-section of an anode including the composite anode active material prepared according to Example 1.
Figure 6B:
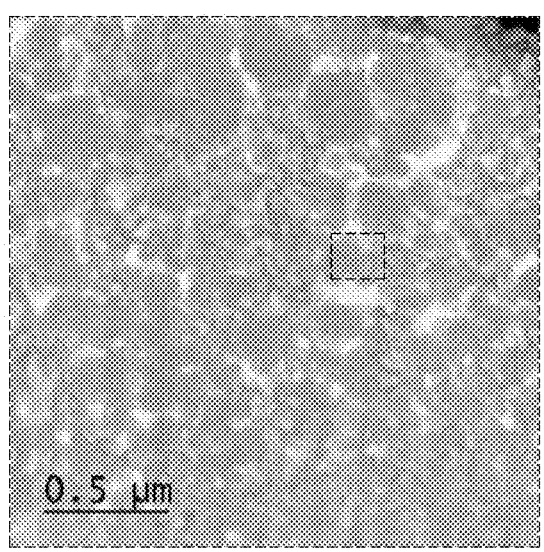
FIG. 6B is an enlarged SEM image of a portion of the image of FIG. 6A.
Figure 6C:
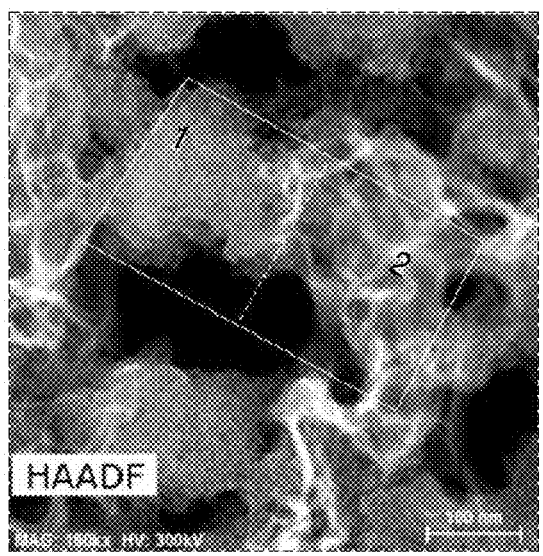
FIG. 6C is an enlarged TEM image of a portion of the image of FIG. 6B.
Figure 6D:
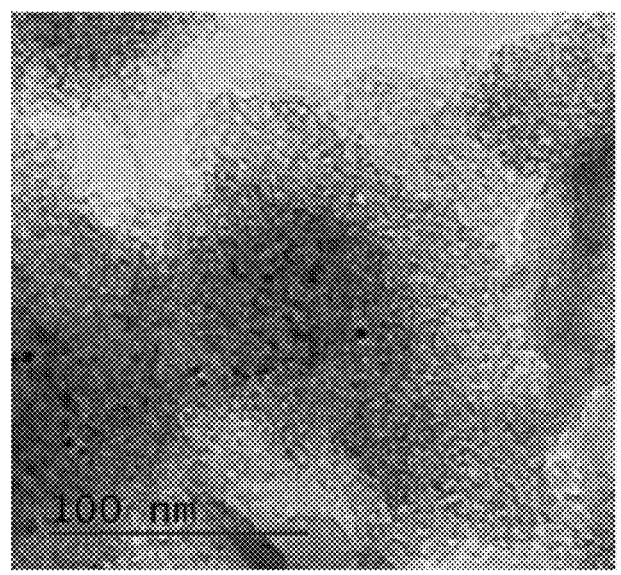
FIG. 6D is an enlarged TEM image of the portion marked with the number 1 in the image of FIG. 6C.
Figure 6E:
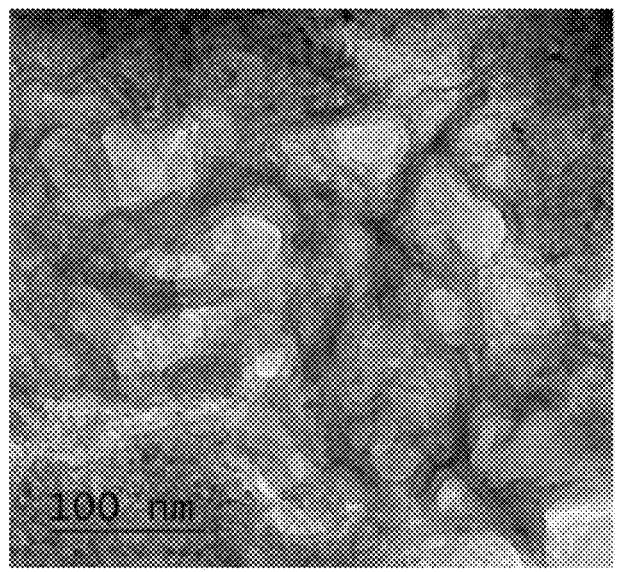
FIG. 6E is an enlarged TEM image of the portion marked with the number 2 in the image of FIG. 6C.
Figure 6F:
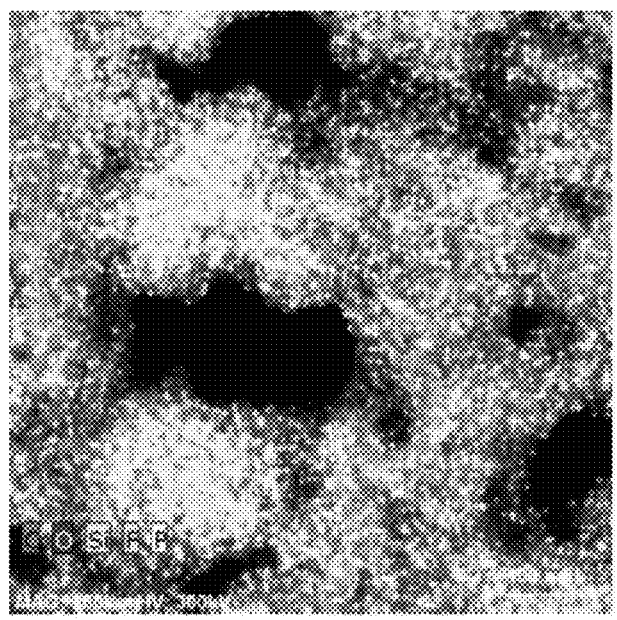
FIG. 6F is an elemental mapping image obtained by subjecting the image of FIG. 6C to high-angle annular dark-field scanning transmission electron microscopy (HDDAF-STEM)
Figure 6G:
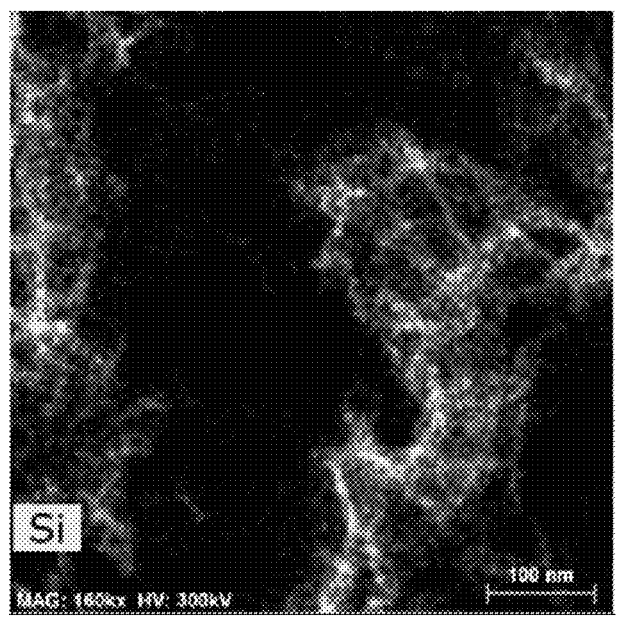
FIG. 6G shows the distribution of Si in the image of FIG. 6C.
Figure 6H:
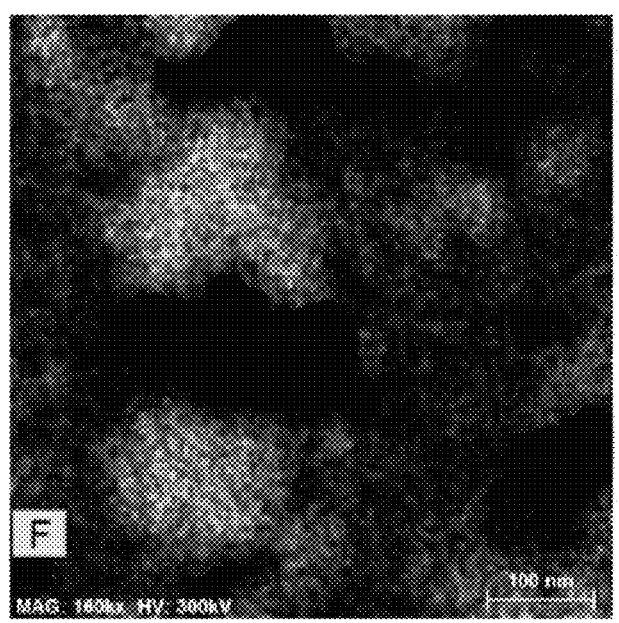
FIG. 6H shows the distribution of F in the image of FIG. 6C.

Referring to FIG. 6H, an amount of halogen in the second medium block of the composite medium may be greater than an amount of halogen in the first medium block. The halogen may be at least one selected from F, Cl, Br, and I. In an embodiment, the halogen may be F.

Figure 6I:
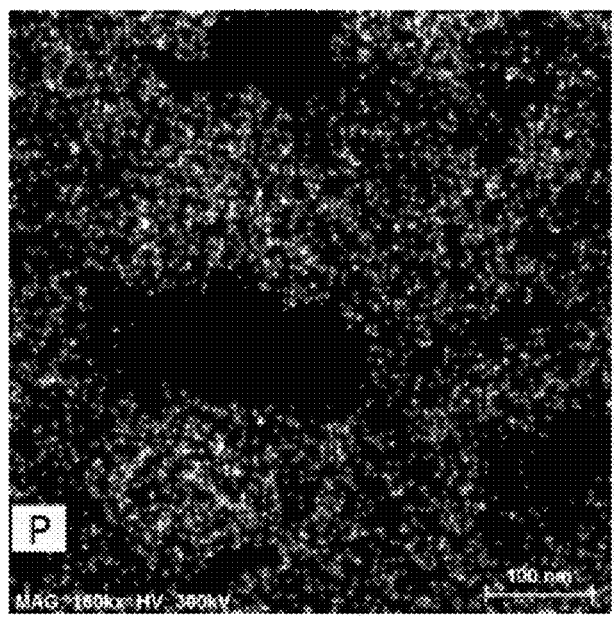
FIG. 6I shows the distribution of P in the image of FIG. 6C.
Figure 6J:
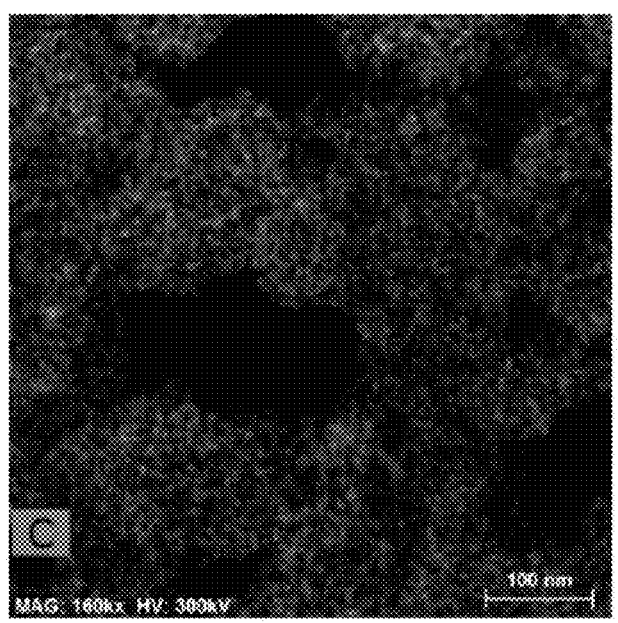
FIG. 6J shows the distribution of C in the image of FIG. 6C.

Referring to FIGS. 6I and 6J, the second medium block in the composite medium may include two or more elements that are included in the conductive medium of the first medium block. In an embodiment, the first medium block and the second medium block may commonly include at least one selected from Li, P, C, F, N, and the like. In an embodiment, the conductive medium of the first medium block may be a Li—F—P—C composite. In an embodiment, the metal nanostructure-free medium included in the second medium may be a Li—F—P—C composite.

Another aspect of the present disclosure provides an anode including the composite anode active material. In an embodiment, the anode may be prepared by molding an anode active material composition including the composite anode active material and a binder, into a certain shape, or by coating the anode active material composition on a current collector, for example, an anode active material copper foil.

In detail, an anode active material composition is prepared which includes the composite anode active material, a conducting agent, a binder, and a solvent. The anode active material composition is coated directly on a metal current collector, thereby preparing an anode plate. In one or more embodiments, the anode active material composition may be cast onto a separate support, and a film exfoliated from the separate support is laminated on a metal current collector thereby preparing an anode plate. The method of preparing the anode is not limited thereto, and any other method suitable for the preparation of an anode may also be used.

In addition to the composite anode active material, the anode active material composition may also include another carbonaceous anode active material. In an embodiment, the carbonaceous anode active material may include at least one selected from natural graphite, artificial graphite, expandable graphite, graphene, carbon black, fullerene soot, carbon nanotube, and carbon fiber, but is not limited thereto. Any carbonaceous anode active material that may be suitable for an anode active material composition may be used.

The conducting agent may be at least one selected from acetylene black, ketjen black, natural graphite, artificial graphite, carbon black, carbon fiber, and metal powder and metal fiber of copper, nickel, aluminum, and silver, and at least one polymeric conductive material, such as a polyphenylene derivative. However, the conducting agent is not limited thereto, and may be any one of various materials that are suitable for use as a conducting agent. Also, the crystalline carbonaceous material may be additionally used as the conducting agent.

The binder may be at least one selected from a vinylidene fluoride/hexafluoropropylene copolymer, polyvinylidene fluoride (PVDF), polyacrylonitrile, poly(methyl methacrylate), polytetrafluoroethylene, and a styrene butadiene rubber-based polymer, but are not limited thereto, and any other materials that are suitable for use as a binder may also be used.

As the solvent, at least one selected from N-methylpyrrolidone, acetone, and water may be used. However, the solvent is not limited thereto, and any other solvents suitable for use in an anode active material composition may also be used.

Suitable amounts of the composite anode active material, the conductive material, the binder, and the solvent in the anode active material composition may be determined by one of skill in the art without undue experimentation. According to the purpose and structure of a lithium battery, one or more of the conducting agent, the binder, and the solvent may not be used.

Another aspect of embodiments of the present disclosure provides a lithium battery including the anode including the composite anode active material. An example of a method of manufacturing a lithium battery is described below.

First, an anode is prepared using the method described above.

Then, a cathode active material composition including a cathode active material, a conducting agent, a binder, and a solvent is prepared. The cathode active material composition is directly coated and dried on a metal current collector to prepare a cathode plate. According to another embodiment of the present invention, the cathode active material composition is cast on a separator support and a film exfoliated from the support is laminated on a metal current collector to prepare a cathode plate.

The cathode active material may be at least one selected from a lithium cobalt oxide, a lithium nickel cobalt, manganese oxide, a lithium nickel cobalt aluminum oxide, a lithium iron phosphate oxide, and lithium manganese oxide. However, the cathode active material is not limited thereto. In an embodiment, any one of various materials that are suitable for use as a cathode active material in the related art may be included in the cathode active material composition.

In an embodiment, the conducting agent may be at least one compound represented by $Li_aA_{1-b}B'_bD_2$ (wherein, $0.90 \leq a \leq 1.8$, and $0 \leq b \leq 0.5$); $Li_aE_{1-b}B'_bO_{2-c}D_c$ (wherein, $0.90 \leq a \leq 1.8$, $0 \leq b \leq 0.5$, $0 \leq c \leq 0.05$); $LiE_{2-b}B'_bO_{4-c}D_c$ (wherein, $0 \leq b \leq 0.5$, and $0 \leq c \leq 0.05$); $Li_aNi_{1-b-c}Co_bB'_cD_\alpha$ (wherein, $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (wherein, $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein, $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein, $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein, $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein, $0.90 \leq a \leq 1.8$, $0 \leq b \leq 0.5$, $0 \leq c \leq 0.05$, and $0 < \alpha < 2$); $Li_aNi_bE_cG_dO_2$ (wherein, $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein, $0.90 \leq a \leq 1.8$, $0 \leq b \leq 0.9$, $0 \leq c \leq 0.5$, and $0 \leq d \leq 0.5$, $0.001 \leq e \leq 0.1$); $Li_aNiG_bO_2$ (wherein, $0.90 \leq a \leq 1.8$, $0.001 \leq b \leq 0.1$); $Li_aCoG_bO_2$ (wherein, $0.90 \leq a \leq 1.8$, $0.001 \leq b \leq 0.1$); $Li_aMnG_bO_2$ (wherein, $0.90 \leq a \leq 1.8$, and $0.001 \leq b \leq 0.1$); $Li_aMn_2G_bO_4$ (wherein, $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A is at least one selected from Ni, Co, and Mn; B' is at least one selected from Al, Ni, Co, Mn, Cr, Fe, Mg, Sr, V, and a rare-earth element; D is at least one selected from O, F, S, and P; E is at least one selected from Co and Mn; F' is at least one selected from F, S, and P; G is at least one selected from Al, Cr, Mn, Fe, Mg, La, Ce, Sr, and V; Q is at least one selected from Ti, Mo, and Mn; I' is at least one selected from Cr, V, Fe, Sc, and Y; and J is at least one selected from V, Cr, Mn, Co, Ni, and Cu.

These compounds may have a coating layer on a surface, or these compounds may be mixed with a compound having a coating layer. The coating layer may include at least one selected from an oxide of a coating element, a hydroxide of a coating element, an oxyhydroxide of a coating element, an oxycarbonate of a coating element, and a hydroxycarbonate of a coating element. The compounds that form the coating layer may be amorphous or crystalline. A coating element included in the coating layer may be at least one selected from Mg, Al, Co, K, Na, Ca, Si, Ti, V, Sn, Ge, Ga, B, As, and Zr. The coating layer may be formed using any known coating methods that are suitable for coating the compounds and the elements, and which does not affect properties of the cathode active material. For example, the coating method may include spray coating, immersion, or the like). These coating methods are known in the art and are not described in detail herein.

In an embodiment, at least one compound selected from $LiNiO_2$, $LiCoO_2$, $LiMn_xO_{2x}$ (x=1 or 2), $LiNi_{1-x}Mn_xO_2$ ($0<x<1$), $LiNi_{1-x-y}Co_xMn_yO_2$ ($0 \leq x \leq 0.5$, $0 \leq y \leq 0.5$), $LiFeO_2$, $V_2O_5$, TiS, and MoS, may be used.

The conducting agent, the binder, and the solvent included in the cathode active material composition may be the same as those used in the anode active material composition. Also, a plasticizer may be further included in the cathode active material composition and/or the anode active material composition, to form pores in an electrode plate.

Amounts of the cathode active material, the conducting agent, the binder, and the solvent may be determined by one of skill in the art without undue experimentation. According to the purpose and structure of a lithium battery, one or more of the conductive material, the binder, and the solvent may not be used.

Then, a separator to be inserted between the cathode and the anode is prepared. The separator may be formed using any material that is suitable for use as a separator in a lithium battery. A material for forming the separator may be a material that has low resistance to ion migration of an electrolyte and which has excellent electrolytic solution retaining capability. In an embodiment, the separator forming material may be at least one selected from glass fiber, polyester, Teflon®, polyethylene, polypropylene, and polytetrafluoroethylene (PTFE), each of which may be in a non-woven fabric or woven fabric form. In detail, a separator for a lithium ion battery may be a rollable separator formed of polyethylene or polypropylene, and a separator for a lithium ion polymer battery may be a separator having excellent organic electrolyte-retaining capabilities. In an embodiment, these separators may be prepared as described below.

A separator composition is prepared by mixing a polymer resin, a filler, and a solvent. The separator composition may be directly coated and dried on an electrode to complete the formation of the separator. In other embodiments, the separator composition may be cast on a separate support and then a film separated from the support is laminated on an electrode, thereby completing the formation of the separator.

A polymer resin used in preparing the separator may not be particularly limited, and any binder material suitable for an electrode plate may be used. In an embodiment, the binder may be at least one selected from a vinylidene fluoride/hexafluoropropylene copolymer, polyvinylidenefluoride (PVDF), polyacrylonitrile, and poly(methyl methacrylate).

Then, an electrolyte may be prepared.

In an embodiment, the electrolyte may be an organic electrolytic solution. Also, the electrolyte may be solid. In an embodiment, the solid electrolyte may be a boron oxide, lithium oxynitride, or the like, but the solid electrolyte may not be limited thereto. Any one of various materials that are used as a solid electrolyte in the related art may be used herein. The solid electrolyte may be formed on the anode by, for example, sputtering.

In an embodiment, an organic electrolytic solution may be prepared. The organic electrolytic solution may be prepared by dissolving a lithium salt in an organic solvent.

The organic solvent may be any one of various materials that are suitable for use as an organic solvent. In an embodiment, the organic solvent may be at least one selected from propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulforane, dichloroethane, chlorobenzene, nitrobenzene, diethyleneglycol, and dimethylether.

The lithium salt may be any material suitable for use as a lithium salt. In an embodiment, the lithium salt may be at least one selected from $LiPF_6$, $LiBF_4$, $LiSbF_6$, $LiAsF_6$, LiClO$_4$, LiCF$_3$SO$_3$, Li(CF$_3$SO$_2$)$_2$N, LiC$_4$F$_9$SO$_3$, LiAlO$_2$, LiAlCl$_4$, LiN(C$_x$F$_{2x+1}$SO$_2$)(C$_y$F$_{2y+1}$SO$_2$) (where x and y are natural numbers), LiCl, and LiI.

Figure 8:
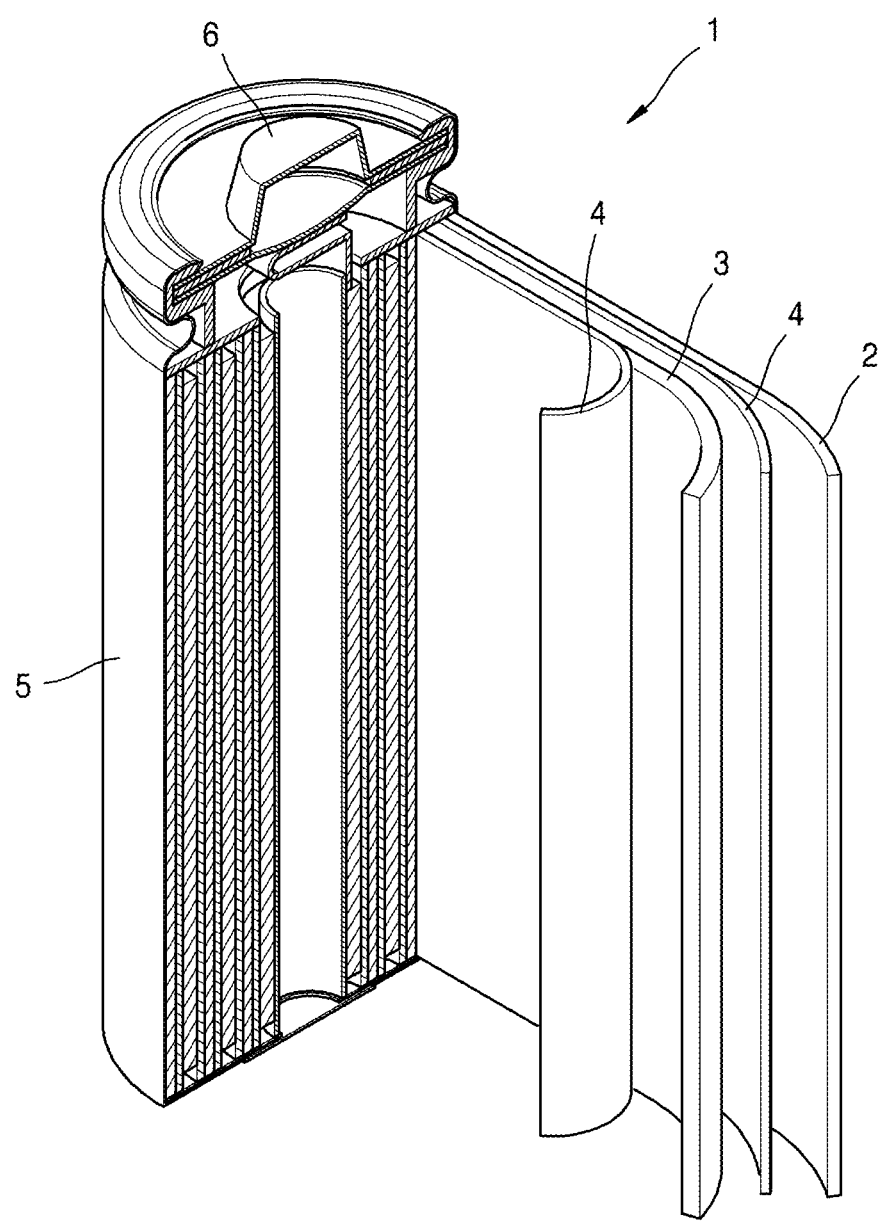
FIG. 8 is a schematic view of a lithium battery according to an embodiment.

Referring to FIG. 8, a lithium battery 1 includes a cathode 3, an anode 2, and a separator 4. The cathode 3, the anode 2, and the separator 4 are wound or folded and are placed in a battery case 5. Subsequently, an organic electrolytic solution is injected into the battery case 5, and the resulting structure is sealed with a cap assembly 6, thereby completing the manufacturing of the lithium battery 1. The battery case 5 may be a circular case, a rectangular case, or a thin-film type case. In an embodiment, the lithium battery 1 may be a thin film-type battery. The lithium battery 1 may be a lithium ion battery.

The separator 4 may be placed between the cathode 3 and the anode 2 to complete the manufacture of a battery assembly. In some embodiments, battery assemblies, each having the structure described above, are stacked in a bi-cell structure, the bi-cell structure is immersed in an organic electrolytic solution, the obtained result is housed in a pouch, and the pouch is sealed, thereby completing the manufacturing of a lithium ion polymer battery.

Also, battery assemblies may be stacked to form a battery pack, and the battery pack may be used in various to provide high capacity and high power output. In an embodiment, the battery pack may be used in a notebook computer, a smart phone, an electric vehicle, or the like.

In particular, due to its high-rate characteristics and lifespan characteristics, the lithium battery may be suitable for use in an electric vehicle (EV). In an embodiment, the lithium battery is suitable for use in a hybrid car, such as a plug-in hybrid electric vehicle (PHEV).

The lithium battery including the composite anode active material may have, with respect to lithium metal, a capacity retention ratio of 70% or more after 300 charge/discharge cycles performed at a voltage range of about 2.5 volts (V) to about 4.3 V. In an embodiment, the lithium battery including the composite anode active material may have, with respect to lithium metal, a capacity retention ratio of 70% or more after 300 charge/discharge cycles performed at a voltage range of about 3.0 V to about 4.2 V. Accordingly, the lithium battery according to an embodiment provides a higher discharge capacity as compared to a lithium battery including a carbonaceous anode active material, and a longer lifespan as compared to a lithium battery including a metal-based anode active material.

Another aspect of the present disclosure provides a method of preparing the composite anode active material, wherein the method includes: preparing an electrochemical cell including a counter electrode and a working electrode including a metal that is capable of intercalation and/or deintercalation of lithium and a carbonaceous conductive agent; applying a sweep voltage across the electrochemical cell in a voltage range of 0 V to about 3 V as measured by a lithium metal reference electrode; and obtaining a working electrode including the composite anode active material in the electrochemical cell.

In the method of preparing the composite anode active material, a metal that is capable of (e.g., enables) intercalation or deintercalation of lithium may be at least one selected from Si, Ge, Sn, Pb, and the like, but is not limited thereto. Any metal that may be capable of intercalation or deintercalation of lithium and which is suitable for use in a lithium battery may be used.

In the method of preparing the composite anode active material, the carbonaceous conducting agent is not limited. Any carbonaceous conducting agent that is suitable for use in an electrode for a lithium battery may be used. In an embodiment, the carbonaceous conducting agent may be at least one selected from graphite, carbon nanotube, carbon nanofiber, and the like.

The working electrode may be prepared in the same manner used to prepare a cathode or an anode for a lithium battery. The working electrode thus may be prepared by referring to the method of preparing a lithium battery as described above.

The electrochemical cell is not particularly limited, and may be a 2-electrode system or a 3-electrode system. The 3-electrode system may additionally include a reference electrode. The electrochemical cell includes an electrode impregnated in an electrolytic solution, and, if needed, the electrochemical cell may further include a separator. The electrolytic solution may be any of the above-described electrolytic solutions and which is suitable for use in a lithium battery.

In the method of preparing the composite anode active material, a sweep voltage may be applied to the working electrode in the voltage range of 0 to about 3 V. For example, the working electrode may be swept with an increasing voltage of from 0 V to about 3 V, and then, with a decreasing voltage of from about 3 V to 0 V, as one cycle, and this cycle may be performed about 1 to about 1,000 times.

The embodiments disclosed herein are described in detail with reference to Examples and Comparative Examples below. However, Examples are provided here for illustrative purposes only, and do not limit the scope of the present invention.

EXAMPLES

Preparation of Composite Anode Active Material

Example 1

55 parts by weight of silicon (Si) powder, 35 parts by weight of artificial graphite, 2 parts by weight of carbon nanotubes (CNT), and 8 parts by weight of a binder solution were mixed to prepare an anode active material slurry. The binder solution used herein was a 4 volume percent (vol. %) lithium polyacrylate (Li-PAA) solution prepared by dissolving a polyacrylic acid (Aldrich, PAA) in water together with Li ions.

The anode active material slurry was coated on a Cu foil, and then, dried in an oven at a temperature of 80° C. for 1 hour, and in a vacuum oven at a temperature of 120° C. for 2 hours. The resultant foil was roll-pressed to complete the manufacture of a working electrode.

A counter electrode was prepared using lithium metal.

The electrolyte used herein was 1.3 molar (M) LiPF$_6$ dissolved in a mixed solvent including ethylene carbonate (EC), diethylene carbonate (DEC), and fluoroethylene carbonate (FEC) (at a volumetric ratio of 2:6:2). An electrochemical cell was prepared which included the working electrode, the counter electrode, and the electrolyte.

The electrochemical cell was swept with a current×hour amount being equal to the capacity of an anode, e.g., 1 hour×current=1 time of anode capacity, for 50 cycles in the voltage range of 0 to 3V.

When the voltage sweep was completed, the working electrode including a composite anode active material was obtained.

Manufacture of Anode and Lithium Battery

Example 2

Preparation of Cathode

A mixture including $LiNi_{0.6}Co_{0.2}Mn_{0.2}O_2$ as a cathode active material, a carbon conducting agent (Denka Black), and polyvinylidene fluoride (PVdF) at a weight ratio of 94:3:3 was mixed with N-methylpyrrolidone (NMP) in an agate mortar to prepare a cathode active material slurry. The cathode active material slurry was coated on a 15 μm-thick aluminum current collector to a thickness of about 40 μm using a doctor blade, and then, dried at room temperature, and then, vacuum-dried at a temperature of 120° C. The resultant structure was roll-pressed, thereby completing the manufacture of a cathode including a cathode active material layer on the 15 μm-thick aluminum current collector.

Preparation of Anode

The working electrode including the composite anode active material prepared according to Example 1 was used as an anode.

Manufacture of Lithium Battery

The anode was rolled to form a circle having a diameter of 16 mm, and the cathode was rolled to form a circle having a diameter of 15 mm, and then, a separator was placed between the cathode and the anode, thereby completing the manufacture of a 2032-type coin full cell.

The separator used herein was a polyethylene-polypropylene copolymer separator having a thickness of 14 μm.

An electrolytic solution used herein was 1.3 M $LiPF_6$ dissolved in a mixed solvent including ethylene carbonate (EC): diethylene carbonate (DEC): fluoroethylene carbonate (FEC) (a volumetric ratio of 2:6:2).

Comparative Example 1

Preparation of Cathode

A cathode was manufactured in the same manner as in Example 2.

Preparation of Anode 55 parts by weight of silicon (Si) powder, 35 parts by weight of artificial graphite, 2 parts by weight of CNT, and 8 parts by weight of a binder solution were mixed to prepare an anode active material slurry. The binder solution used was a 4 vol. % Li-polyacrylic acid (Aldrich, Li-PAA) solution prepared by dissolving PAA in water together with Li ions.

The anode active material slurry was coated on a Cu foil, and then, dried in an oven at a temperature of 80° C. for 1 hour, and then, in a vacuum oven at a temperature of 120° C. for 2 hours. The result was roll-pressed to complete the manufacture of an anode.

Manufacture of Lithium Battery

A lithium battery was manufactured in the same manner as in Example 2 with the prepared anode.

Evaluation Example 1

Scanning Electron Microscope (SEM) and TEM Measurements

FIG. 6A shows a SEM image of a cross-section of the working electrode including the composite anode active material prepared according to Example 1. FIG. 6B is an enlarged SEM image of the marked portion of the image shown in FIG. 6A. FIG. 6C is an enlarged TEM image of the marked portion shown in FIG. 6B.

In FIG. 6C, the white region in the image is silicon, and the black region is a pore. A plurality of silicon nanowires are irregularly arranged in a random manner to form a net having a three-dimensional nanostructure. The three-dimensional nanostructure has a size of about 300 nm.

In FIG. 6C, a region marked with the number 1 does not have a silicon nanowire, and only has a gray medium. Accordingly, this portion is the second medium block that consists of the metal nanostructure-free medium.

In FIG. 6C, a region marked with the number 2 includes the silicon nanowire and the gray medium. Accordingly, this portion is the first medium block that consists of a metal nanostructure and a conducting medium.

FIG. 6D is an enlarged view of the region marked with the number 1 shown in FIG. 6C. FIG. 6E is an enlarged view of the region marked with the number 2 shown in FIG. 6C.

The contrast of FIG. 6D was reversed from that of FIG. 6C. That is, in FIG. 6D, the light gray portion is a pore, and the black portion is the metal nanostructure-free medium.

The contrast of FIG. 6E was reversed from that of FIG. 6C. That is, in FIG. 6E, the light gray portion is a pore, and the relatively black portion is the silicon nanostructure.

Referring to FIG. 6E, it was confirmed that a plurality of silicon nanowires were irregularly arranged in an random manner to form a net structure, and a conducting medium, that is, a coating layer was formed on each of the silicon nanowires.

The silicon nanowires may each have a diameter of about 10 nm, and the coating layer may have a thickness of about 10 nm to 50 nm.

FIG. 6F shows an elemental mapping image obtained by subjecting the image of FIG. 6C to high-angle annular darkfield-scanning transmission electron microscopy (HD-DAF-STEM).

The images of FIGS. 6G to 6K are reproduced from the image of FIG. 6F according to an element.

As shown in FIG. 6G, it was confirmed that, regarding Si, the region marked with the number 1, that is, the second medium block, did not include a silicon nanowire, and first medium blocks disposed on opposite sides of the second medium block included the silicon nanowire.

Referring to FIG. 6H, it was confirmed that F dominated the second medium block, and there was more F present in the second medium block than in the first medium block.

Referring to FIGS. 6I and 6J, it was confirmed that P and C exist relatively uniformly in the first medium block and the second medium block.

Figure 6K:
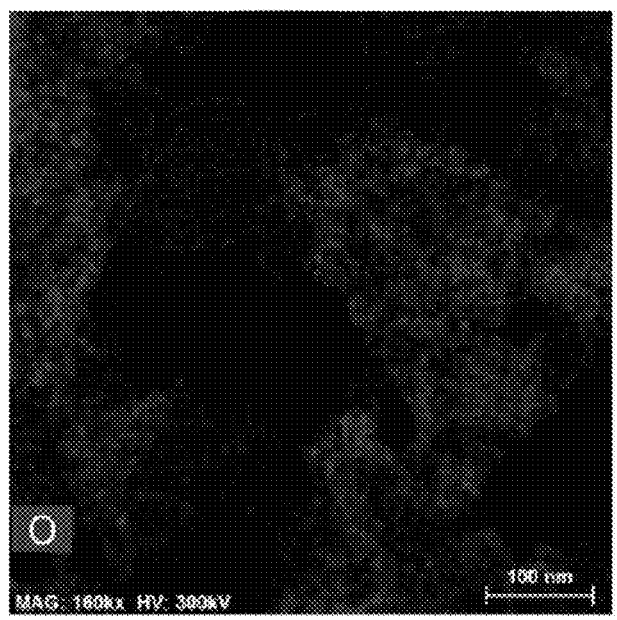
FIG. 6K shows he distribution of O in the image of FIG. 6C.

Referring to FIG. 6K it was confirmed that there was a greater amount of 0 in the second medium block than in the first medium block.

Referring to FIGS. 6F to 6K, it was confirmed that the first medium block included Si, F, P, C, and O, and the second medium block included F, P, and C.

Evaluation Example 2

Charging and Discharging Evaluation

The lithium batteries manufactured according to Example 2 and Comparative Example 1 were charged with a constant current at a temperature of 25° C. at a rate of 1 C until a voltage reached 4.2 V (vs. Li), and then, in a constant voltage mode, while the voltage was maintained at 4.2 V, the lithium batteries were cut-off at a rate of 0.01 C. Then, the lithium batteries were discharged with a constant current at a rate of 1 C until the voltage reached 3.0 V (vs. Li). This cycle of charging and discharging was repeatedly performed for a total of 300 times.

In all of the charging and discharging cycles, every charging/discharging cycle was followed by 10 minutes of storing.

Figure 7:
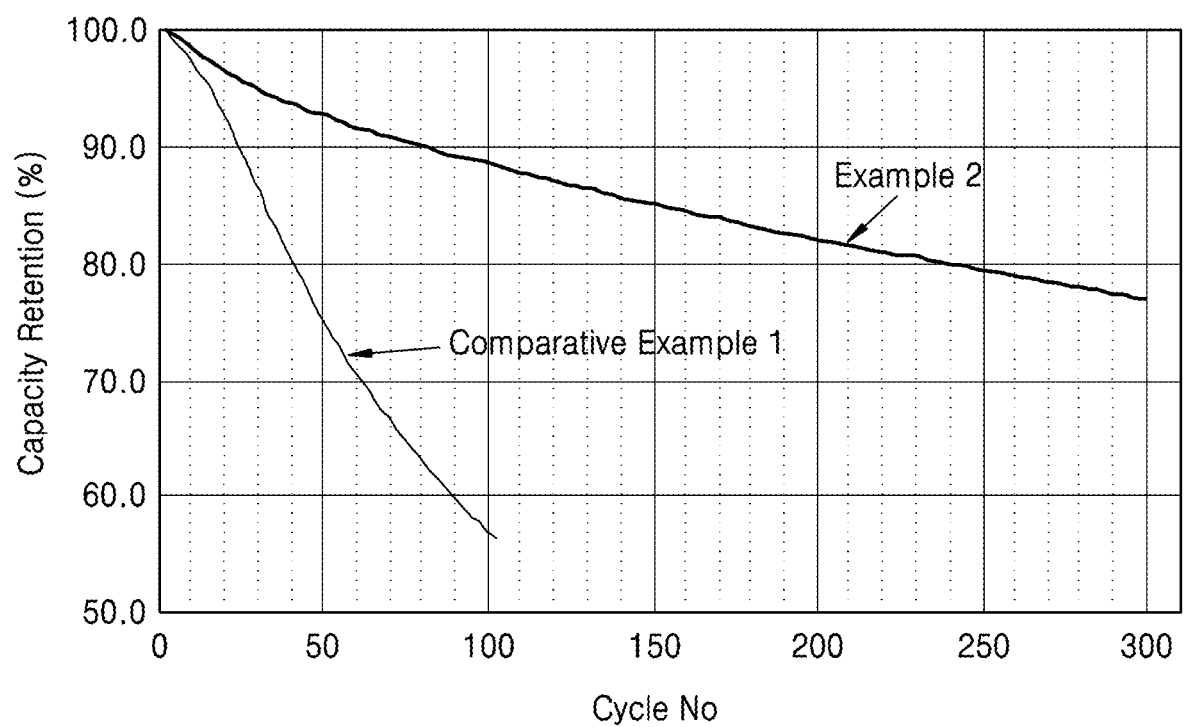
FIG. 7 is a graph of capacity retention (%) versus cycle number (No.) showing the charge and discharge test results of lithium batteries manufactured according to Example 2 and Comparative Example 1.

Results of the charging/discharging test are shown in Table 1 and in FIG. 7. A capacity retention ratio in the 100$^{th}$ cycle is defined as below.

Capacity retention ratio [%] in 100$^{th}$ cycle=[discharge capacity in 100$^{th}$ cycle/discharge capacity in 1$^{st}$ cycle]×100%   Equation 3

TABLE 1

|  | Capacity retention ratio [%] |
|---|---|
| Example 2 | 89.2 |
| Comparative Example 1 | 56.5 |

As shown in Table 1, the lithium battery of Example 2 has better lifespan characteristics than the lithium battery of Comparative Example 5.

In embodiments of the present disclosure, due to the inclusion of a composite anode active material that includes first medium blocks including a metal nanostructure, and a second medium block including a metal nanostructure-free medium disposed therebetween, high-rate characteristics, and lifespan characteristics of a lithium battery may be improved.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite anode active material comprising a composite medium, the composite medium comprising:
   a first medium block comprising a metal nanostructure capable of intercalation or deintercalation of lithium and a conductive medium disposed on the metal nanostructure; and
   a second medium block disposed adjacent to the first medium block and comprising a metal nanostructure-free medium,
   wherein the metal nanostructure-free medium of the second medium block is the same as the conductive medium of the first medium block.

2. The composite anode active material of claim 1, wherein the second medium block is connected to an end of the first medium block, and the first medium block and the second medium block are a composite medium unit.

3. The composite anode active material of claim 2, wherein the composite medium comprises a composite medium chain, and the composite medium chain comprises a plurality of the composite medium units disposed in a first direction.

4. The composite anode active material of claim 3, wherein in the composite medium chain, the plurality of composite medium units are disposed such that the first medium block and the second medium block are alternately disposed in the first direction.

5. The composite anode active material of claim 2, wherein the composite medium comprises a composite medium sheet, and the composite medium sheet comprises a plurality of composite medium units disposed in a first direction and a plurality of composite medium units disposed in a second direction different from the first direction.

6. The composite anode active material of claim 2, wherein the composite medium comprises a composite medium cluster, and the composite medium cluster comprises a plurality of composite medium units disposed in a first direction, a plurality of composite medium units disposed in a second direction different from the first direction, and a plurality of composite medium units disposed in a third direction different from the first and second directions.

7. The composite anode active material of claim 6, wherein the composite medium cluster further comprises a pore defined by a space between the plurality of composite medium units spaced apart from each other.

8. The composite anode active material of claim 1, wherein the composite medium comprises a plurality of first medium blocks, the plurality of first medium blocks are spaced apart from each other at predetermined intervals and are periodically disposed.

9. The composite anode active material of claim 1, wherein the metal nanostructure-free medium comprises a buffer medium capable of absorbing a volumetric change of the first medium.

10. The composite anode active material of claim 1, wherein the first medium block and the second medium block each have a dimension of about 10 nanometers to about 10 micrometers.

11. The composite anode active material of claim 1, wherein the conductive medium disposed on the metal nanostructure is a coating layer on a surface of the metal nanostructure.

12. The composite anode active material of claim 11, wherein the coating layer has a thickness of about 1 nanometer to about 100 nanometers.

13. The composite anode active material of claim 1, wherein the metal nanostructure is a one-dimensional metal nanostructure.

14. The composite anode active material of claim 13, wherein the one-dimensional metal nanostructure comprises a metal nanowire.

15. The composite anode active material of claim 13, wherein the one-dimensional metal nanostructure has a diameter of about 0.1 nanometer to about 100 nanometers.

16. The composite anode active material of claim 13, wherein the one-dimensional metal nanostructure comprises at least one metal selected from Si, Ge, Sn, and Pb.

17. The composite anode active material of claim 13, wherein the first medium block comprises a plurality of one-dimensional metal nanostructures.

18. The composite anode active material of claim 17, wherein the first medium block comprises a three-dimensional metal nanostructure comprising the plurality of one-dimensional metal nanostructures.

19. The composite anode active material of claim 18, wherein the three-dimensional metal nanostructure has a net structure.

20. The composite anode active material of claim 18, wherein the three-dimensional metal nanostructure has a dimension in a range of about 10 nanometers to about 10 micrometers.

21. The composite anode active material of claim 1, wherein the conductive medium of the first medium block comprises at least one element selected from C, O, F, CI, Br, I, P, N, S, B, Sb, As, Si, Ge, Sn, Pb, and Al.

22. The composite anode active material of claim 1, wherein the conductive medium of the first medium block is a solid electrolyte.

23. The composite anode active material of claim 1, wherein the second medium block is ionically conductive or electronically conductive.

24. The composite anode active material of claim 1, wherein the second medium block comprises a halogen, and an amount of the halogen in the second medium block is greater than an amount of the halogen in the first medium block.

25. The composite anode active material of claim 1, wherein the halogen is F.

26. The composite anode active material of claim 1, wherein the second medium block comprises two or more elements which are present in the first medium block.

27. An anode comprising a composite anode active material, the composite anode active material comprising a composite medium, wherein the composite medium comprises:
- a first medium block comprising a metal nanostructure capable of intercalation or deintercalation of lithium and a conductive medium disposed on the metal nanostructure; and
- a second medium block disposed adjacent to the first medium block, and comprising a metal nanostructure-free medium.
- wherein the metal nanostructure-free medium of the second medium block is the same as the conductive medium of the first medium block.

28. A lithium battery comprising:
a cathode; and
the anode of claim 27.

29. The lithium battery of claim 28, wherein a capacity retention ratio of the lithium battery is 70% or more after 300 charge/discharge cycles performed at a voltage range of about 2.5 volts to about 4.3 volts.

* * * * *